US008323803B2

(12) United States Patent
Wu et al.

(10) Patent No.: US 8,323,803 B2
(45) Date of Patent: Dec. 4, 2012

(54) IMAGING MEMBER

(75) Inventors: Jin Wu, Webster, NY (US); Jing Zhou, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 678 days.

(21) Appl. No.: 12/416,197

(22) Filed: Apr. 1, 2009

(65) Prior Publication Data

US 2010/0255413 A1 Oct. 7, 2010

(51) Int. Cl.
*B32B 27/34* (2006.01)

(52) U.S. Cl. .................................................... 428/474.4

(58) Field of Classification Search ......................... None
See application file for complete search history.

(56) References Cited

U.S. PATENT DOCUMENTS 5,175,568 A 12/1992 Oyamaguchi et al.
5,200,762 A 4/1993 Katano et al.
6,108,021 A 8/2000 Morikawa et al.
6,146,798 A 11/2000 Bringans et al.
6,146,812 A 11/2000 Leon et al.
6,162,578 A 12/2000 Zheng et al.
6,387,588 B1 5/2002 Katano et al.
6,447,978 B1 9/2002 Leon et al.
6,465,152 B1 10/2002 DoMinh et al.
6,725,777 B2 4/2004 Katano
6,783,847 B1 * 8/2004 Minami et al. ................ 428/331
6,893,798 B2 5/2005 Verschueren et al.
7,008,751 B2 3/2006 Tao et al.
7,020,355 B2 3/2006 Lahann et al.
7,061,513 B2 6/2006 Katano et al.
7,194,956 B2 3/2007 Mori et al.
7,205,091 B2 4/2007 Cassidy
7,351,517 B2 4/2008 Rondon
7,354,884 B2 * 4/2008 Hada et al. .................... 503/207
8,062,719 B2 * 11/2011 Poncelet et al. ........... 428/32.23
2002/0048718 A1 4/2002 Zheng et al.
2006/0160016 A1 7/2006 Deutsch et al.

FOREIGN PATENT DOCUMENTS

WO 03053882 A1 7/2003
WO WO2008/000352 * 1/2008

OTHER PUBLICATIONS

Gilcreest et al., "Thermoresponsive Poly(N-isopropylacrylamide) Copolymers: Contact Angles and Surface Energies of Polymer Films", Langmuir, 2004, 20, 10138-10145, American Chemical Society.
Saitoh et al., "Manipulate fluid in microchannels with thermo-responsive film", Analytica Chimica Acta 536 (2005) 179-182, Elsevier, Science Direct.
Sun et al., "Reversible Switching between Superhydrophilicity and Superhydrophobicity", Angew. Chem. Int. Ed. 2004, 43, 357-360, Wiley-VCH Verlg GmbH & Co. KGaA, Weinheim.
Verplanck et al., "Wettability Switching Techniques on Superhydrophobic Surfaces", Nanoscale Res Let (2007) 2:577-596,.
Wang et al., "tow-Cost, Thermoresponsive Wettability of Surfaces: Poly(N-isopropylacrylamide)/Polystyrene Composite Films Prepared by Electrospinning", Macromol. Rapid Commun. 2008, 29, 485-489, Wiley-VCH Verlg GmbH & Co. KGaA, Weinheim.
Xia et al., "Multiresponsive Surfaces Change Between Superhydrophilicity and Superhydrophobicity", Adv. Mater. 2007, 19, 2520-2524, Wiley-VCH Verlg GmbH & Co. KGaA, Weinheim.
Oralkan et al., "High-Frequency CMUT Arrays for High-Resolution Medical Imaging", 2004 IEEE Ultrasonics Symposium, Ferroelectrics and Frequency Control Joint 50th Anniversary Conference.
Tao et al, "A metamaterial absorber for the terahertz regime: Design, fabrication and characterization", Optics Express, May 12, 2008, vol. 16, No. 10, 7181-7188.

* cited by examiner

*Primary Examiner* — Sheeba Ahmed
(74) *Attorney, Agent, or Firm* — Fay Sharpe LLP

(57) ABSTRACT

An imaging member is disclosed having a surface layer comprising a heat-sensitive material whose surface compatibility to printing agents, such as toners and inks, can be substantially reversed in response to small changes in temperature. The imaging member is suitable for use in lithographic and printing applications, permitting reversible switching between compatibility states of printing agents, such as between hydrophilic and hydrophobic states or oleophilic and oleophobic states, and enabling rapid production of images on a recording medium. The heat-sensitive material comprises an acrylamide polymer and a silicon material.

17 Claims, 8 Drawing Sheets

IMAGING MEMBER

CROSS REFERENCE TO RELATED PATENTS AND APPLICATIONS

This application is related to U.S. patent application Ser. No. 12/060,427, filed on Apr. 1, 2008, now U.S. Pat. No. 8,107,843. This application is also related to U.S. patent application Ser. No. 12/245,578, filed on Oct. 3, 2008; and to U.S. patent application Ser. No. 12/502,949, filed on Jul. 14, 2009, now U.S. Pat. No. 8,040,364; and U.S. patent application Ser. No. 12/416,189 filed on Apr. 1, 2009. These four patent applications are hereby fully incorporated by reference herein.

BACKGROUND

The present disclosure relates to an imaging member having a heat sensitive material whose surface compatibility to printing agents, such as toners and inks, can be substantially changed in response to a small variation in temperature. For example, a hydrophobic area of the surface of an imaging member can be quickly switched to a hydrophilic area upon exposure to a temperature shift. Similarly, an oleophilic area of the surface of the imaging member can be switched to an oleophobic surface. This disclosure also relates to apparatuses including such imaging members, and methods of using such imaging members, such as in lithographic printing applications.

Lithography is a method for printing using a generally smooth surface. The surface, such as the surface of a plate or of an imaging member, is comprised of (i) hydrophobic areas that repel solution (water) and attract ink; and (ii) hydrophilic areas that repel ink and attract solution. Fountain solution, which is typically a water-based solution, is then applied to the surface and adheres to the hydrophilic (i.e. oleophobic) areas while the ink adheres to the hydrophobic (i.e. oleophilic) areas to form the image.

In offset lithography, the image on the imaging member is generally then transferred to an intermediate transfer member which picks up the ink. The ink image on the intermediate transfer member is then transferred to the final substrate (e.g. paper).

Offset lithography offers consistent high image quality, large substrate latitude, and longer printing plate life compared to direct lithography processes. In addition, offset lithography generally offers lower costs for large-quantity duplicated printing because most of the cost in offset lithography is incurred upfront.

Conventional lithography techniques use an image plate with permanent hydrophobic areas and hydrophilic areas. However, such plates are costly and require considerable set-up time. This limits the attractiveness of lithography for short-run printings (i.e. low quantity) and variable-data printings (e.g. direct mail ads).

One approach has been to utilize heat-sensitive materials on the plate or imaging member to enable digital variable-data printing. However, such materials generally require high temperatures (e.g. greater than 100° C.) and/or are slow to reverse their state. It would be desirable to provide devices and/or methods for lithography where hydrophilic/hydrophobic states, etc., could be quickly changed by small temperature changes.

BRIEF DESCRIPTION

The present disclosure is directed to an imaging member useful for printing processes such as digital-direct or digital-offset lithography. The imaging member comprises a surface outer layer of a heat sensitive material whose surface compatibility to printing agents, such as toners and inks, can be substantially changed in response to variations in temperature. This heat sensitive material shifts between hydrophilic/hydrophobic states, oleophilic/oleophobic states, or other compatible/incompatible states, or vice versa, after being exposed to a small temperature change at a time scale compatible with typical offset press speeds. This system allows the imaging member to be quickly changed to print different images with only a small amount of heat added to or removed from the imaging member. Printing apparatuses containing the imaging member and methods of printing using such an imaging member are also disclosed.

In some embodiments is disclosed an imaging member, comprising: a substrate; and a surface layer comprising a heat sensitive material, the heat sensitive material comprising an acrylamide polymer and a silicon material.

The heat sensitive material may be in the form of a block copolymer comprising acrylamide blocks and polysilsequioxane blocks, or in the form of a particle having a silica core and an acrylamide polymer shell.

The imaging member may be in the form of an endless belt, a cylindrical sleeve, or a cylinder. The imaging member may also further comprise an absorption layer between the substrate and the surface layer. The absorption layer may comprise an addressable metamaterial, in forms such as individually addressable unit cells controlled by integrated circuitry.

Disclosed in other embodiments is a printing apparatus comprising: a heat source; an ink source; and an imaging member comprising (i) a substrate and (ii) a surface layer comprising a heat sensitive material, the heat sensitive material comprising an acrylamide polymer and a silicon material.

The acrylamide polymer may be a copolymer that comprises an N-isopropylacrylamide monomer, or it may be an N-isopropylacrylamide homopolymer.

The acrylamide polymer alternatively comprises a monomer selected from the group consisting of monomers (a)-(d):

(a)

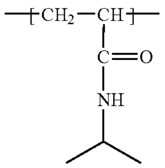

(b)

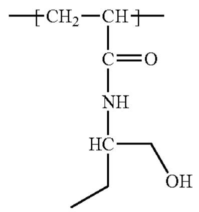

(c)

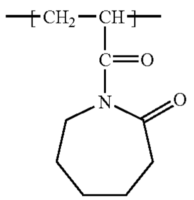

-continued (d)

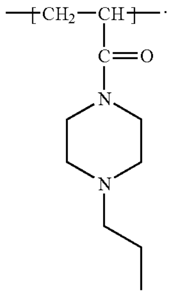

The acrylamide polymer may also be a homopolymer.

The heat sensitive material may switch states when exposed to a temperature of from about 10° C. to about 120° C., including a temperature greater than about 25° C. and less than about 90° C. or a temperature of about 25° C. to about 40° C.

The heat sensitive material may permit reversible switching (i) between hydrophilic and hydrophobic states; (ii) between oleophilic and oleophobic states; or (iii) between a printing agent compatible state and a printing agent non-compatible state.

The heat sensitive material may be a block copolymer comprising acrylamide blocks and polysilsequioxane blocks. The acrylamide blocks and polysilsequioxane blocks can be separated by a divalent linkage.

The heat sensitive material may also be a particle having a silica core and an acrylamide polymer shell.

The imaging member may further comprise an absorption layer between the substrate and the surface layer. The absorption layer may be a radiation absorption layer, be addressable, and/or comprise a metamaterial.

The surface layer can be a rough, i.e. non-smooth, surface. The roughness may be caused by ordered structures and/or random structures being present on the top surface. The surface layer may have a roughness of from about 10 nanometers to about 100 microns in the lateral direction (along the surface) and from about 10 nanometers to about 10 microns in the vertical direction (i.e. perpendicular to the surface). Such structures could be naturally formed during the fabrication/synthesis process, or be artificially created as an additional manufacturing step. The structures may be on the micron or nanometer scale, or multiscale (hierarchical) structures. The structures causing the roughness can be in the shape of, for example, grooves, bumps, pillars, etc. For example, the surface layer may comprise orderly structured grooves. The grooves may have a width of about 10 nanometers to about 10 microns, a depth of about 10 nanometers to about 10 microns, and/or a spacing of about 10 nanometers to about 100 microns between adjacent grooves.

The heat source may be an electromagnetic heating device (e.g. optical or microwave), an acoustic heating device, a thermal print head, a resistive heating finger, or a microheater array. The heat source can be located within the imaging member between the substrate and the surface layer. The heat source may also be located separately from the imaging member.

The printing apparatus may optionally comprise an intermediate transfer member that forms a transfer nip with the imaging member, along with a secondary heat source adapted to provide heat in or near the transfer nip, and/or a cleaning unit to clean the intermediate transfer member.

Also disclosed is a method of printing comprising: coating a substrate with a heat sensitive material, the heat sensitive material comprising an acrylamide polymer and a silicon material; selectively exposing the surface layer to a thermal stimulus to form an image area and a non-image area; filling the image area with a printing agent to form a printed image; and transferring the printed image to a recording medium.

In still other embodiments is disclosed an imaging member, comprising: a substrate; and a surface layer comprising a heat sensitive material, the heat sensitive material comprising a core-shell particle, the particle comprising a core and a shell coating comprising an acrylamide polymer.

The core may comprise a metal oxide or metal nitride, such as silica or silicon nitride.

These and other non-limiting aspects and/or objects of the disclosure are more particularly described below.

BRIEF DESCRIPTION OF THE DRAWINGS

The following is a brief description of the drawings, which are presented for the purposes of illustrating the disclosure set forth herein and not for the purposes of limiting the same.

DETAILED DESCRIPTION

Figure 1:
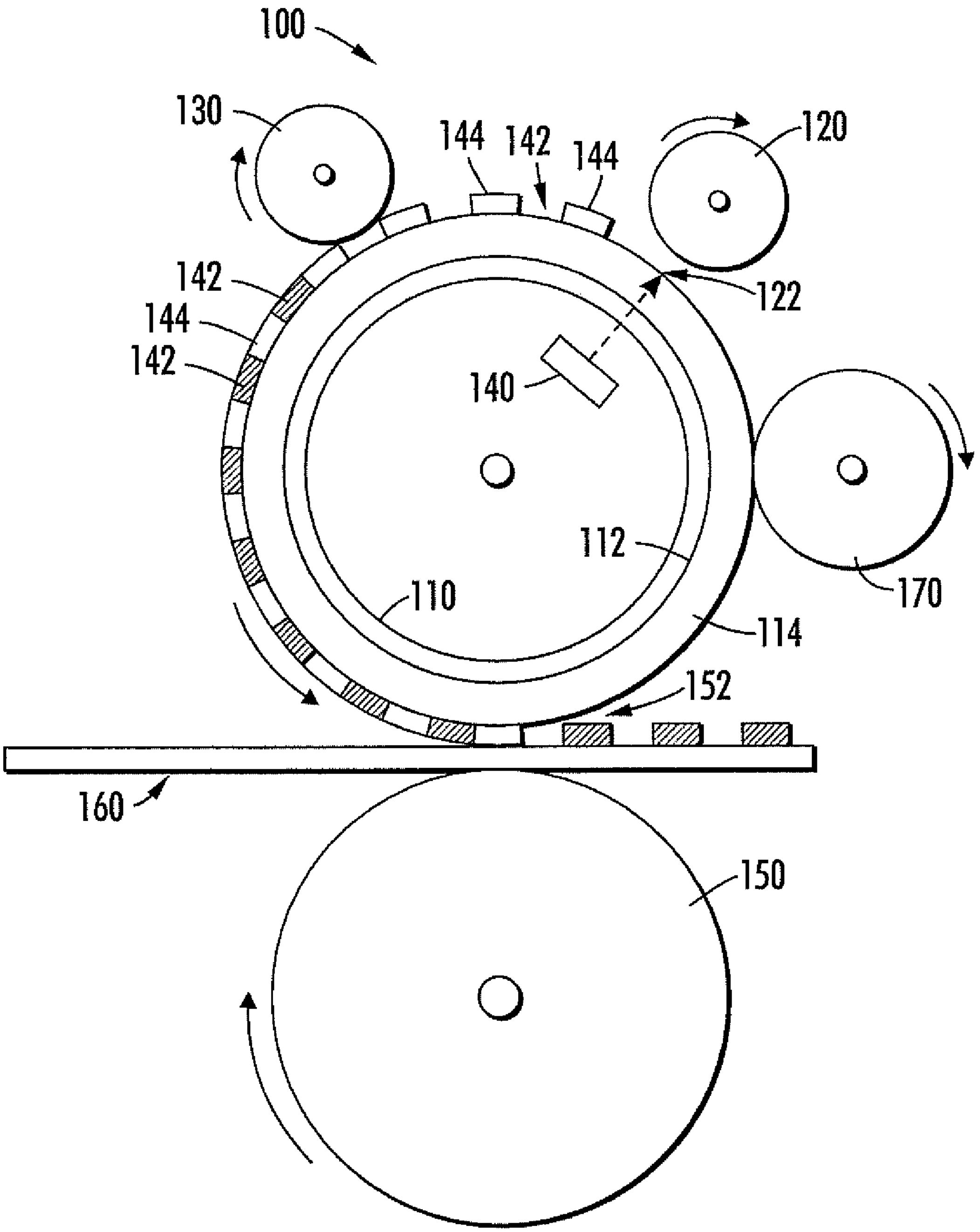
FIG. 1 is a first exemplary embodiment of a printing apparatus of the present disclosure.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The present disclosure relates to an imaging member comprising a surface layer of a heat sensitive material (i.e. a reversible surface energy material). The compatibility of the heat sensitive material with a printing agent (such as a toner or ink) can be substantially reversed in response to a temperature change. The heat sensitive material can also be considered as permitting reversible switching between compatible and non-compatible states.

In a compatible state, the printing agent is attracted to the surface while in a non-compatible state, the printing agent is repelled. Examples of switching between compatible and non-compatible states include switching from either a hydrophilic state to a hydrophobic state or from an oleophilic state to an oleophobic state, or vice versa, when exposed to a small change in temperature. In a hydrophilic state, the material is relatively attracted to water or other aqueous solution, while in a hydrophobic state the material tends to repel water or other aqueous solution. In an oleophilic state, the material is relatively attracted to oils, while in a oleophobic state the material tends to repel oils.

The imaging member of the present disclosure can be useful in a printing apparatus for digital-direct lithography or digital-offset lithography. The present disclosure is also related to a printing apparatus comprising a heat source, an ink source, and an imaging member as described herein. The heat source may be located within (i.e. integral to) the imaging member or a separate unit or component of the printing apparatus.

FIG. 1 shows a first embodiment of a printing apparatus 100 of the present disclosure. The printing apparatus 100 comprises an imaging member 110. The imaging member comprises a substrate 112 and a surface layer 114. The surface layer is the outermost layer of the imaging member, i.e. the layer of the imaging member furthest from the substrate. The surface layer 114 comprises a heat sensitive material. As shown here, the substrate is a cylinder; however, the substrate may also be in a belt form (see FIG. 8), etc. The surface layer 114 may have a thickness of from about 1 micron to about 100 microns, including from about 5 microns to about 60 microns, or from about 10 microns to about 50 microns.

In the depicted embodiment the imaging member 110 rotates counterclockwise. The apparatus includes a fountain solution source 120 and an ink source 130. Here, the ink is similar to commercial offset inks (i.e. an oil-based ink). A primary heat source 140 is located so that heat can be generated on and/or applied to the surface layer 114 prior to the application of the fountain solution and the ink. For example, as shown here, the primary heat source 140 is located so heat is applied at a nip region 122 between the imaging member 110 and the fountain solution source 120. The primary heat source 140 selectively heats portions of the surface layer 114 to create image areas 142 and non-image areas 144 on the surface layer. Fountain solution is then applied to the non-image areas and ink is applied to the image areas to form an ink image. Generally, when fountain solution is applied, it is applied prior to application of the ink.

An impression cylinder 150 feeds a recording medium or printing substrate 160, such as paper, to a nip region 152 between the impression cylinder 150 and the imaging member 110. The ink image is then transferred to the printing substrate. A cleaning unit 170 cleans the imaging member of any residual ink or fountain solution. The cleaning unit may also cool down the surface layer from an elevated temperature in selected areas to an initial state where the temperature of the surface layer is relatively constant over its entirety.

Figure 2:
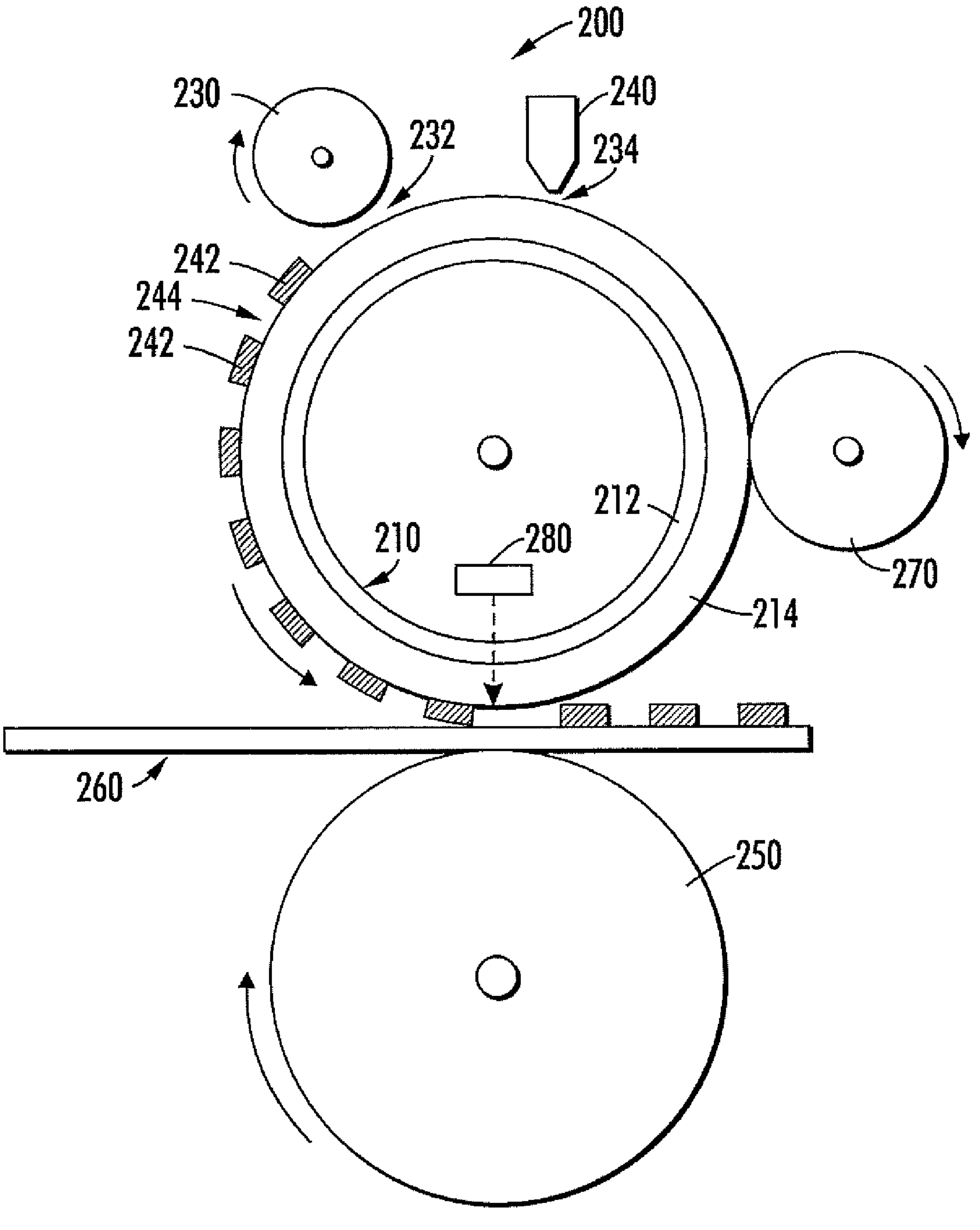
FIG. 2 is a second exemplary embodiment of a printing apparatus of the present disclosure.

FIG. 2 shows a second embodiment of a printing apparatus 200 of the present disclosure. This printing apparatus 200 includes a cylinder 210 over which is placed an imaging member comprising a substrate 212 and surface layer 214. Here, the imaging member is in the form of a cylindrical sleeve. The printing apparatus 200 also includes ink source 230, primary heat source 240, impression cylinder 250, printing substrate 260, and cleaning unit 270 as described with respect to FIG. 1. However, no fountain solution source is provided. The primary heat source 240 can be located so heat is generated on and/or applied at a nip region 232 between the imaging member 210 and the ink source 230. Alternatively, the heat can be applied at a pre-nip region 234 again located prior to the ink source 230.

In this embodiment, any of the principal types of ink (oil-based, water-based, ultraviolet-curable) can be used. Application of heat to the surface layer 214 would create ink compatible areas 242 and non-compatible areas 244. For example, an oil-based ink would be applied to oleophilic areas 242, while a water-based ink would be applied to hydrophilic areas 244. The oleophobic or hydrophobic area would not be inked respectively.

In addition, a secondary heat source 280 is located near a nip region 252 between the impression cylinder 250 and the imaging member 210. The secondary heat source could be used to increase the efficiency of the transfer of ink from the imaging member 210 to the printing substrate 260. For example, the surface layer 214 becomes oleophobic after being heated. After the surface layer is selectively heated, an oil-based ink would be applied to the oleophilic areas. Then, as the oil-based ink is being transferred to the printing substrate, the secondary heat source 280 could heat the oleophilic areas, switching them to oleophobic areas and causing complete release of the ink from the imaging member 210.

Figure 3:
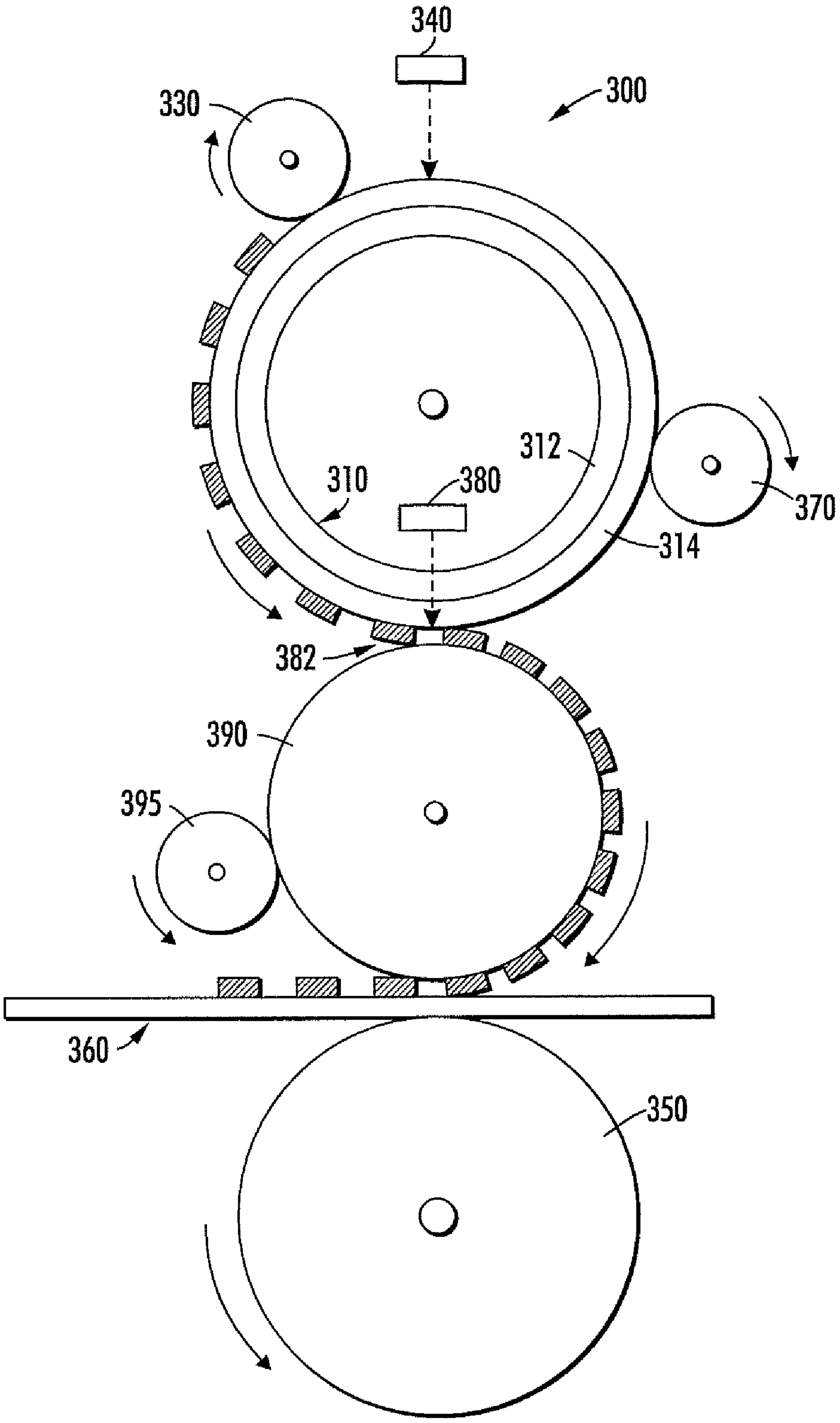
FIG. 3 is a third exemplary embodiment of a printing apparatus of the present disclosure.

FIG. 3 shows a third embodiment of a printing apparatus 300 of the present disclosure. This printing apparatus 300 includes imaging member 310 with substrate 312 and surface layer 314, ink source 330, primary heat source 340, impression cylinder 350, printing substrate 360, and cleaning unit 370 as described with respect to FIG. 1. In addition, the printing apparatus comprises an intermediate transfer member 390 located between imaging member 310 and impression cylinder 350. The ink image formed on the imaging member 310 is transferred to the intermediate transfer member 390, then to the printing substrate 360. As shown here, the secondary heat source 380 provides heat near a transfer nip 382 between the imaging member 310 and the intermediate transfer member 390. Transfer member cleaning unit 395 may be present to clean the intermediate transfer member 390.

The heat sensitive material used in the surface layer comprises (i) an acrylamide polymer; and (ii) a silicon material. In this disclosure, at least two different forms of heat sensitive materials are contemplated. In one form, the heat sensitive material is a block copolymer, wherein the acrylamide polymer and the silicon material are blocks in the block copolymer. In another form, the heat sensitive material is a particle of the core-shell type, wherein the silicon material forms the core and the acrylamide polymer forms the shell.

The acrylamide polymer comprises an acrylamide monomer, and is generally homopolymeric. The acrylamide polymer will contain an acrylamide unit of Formula (I):

Formula (I)

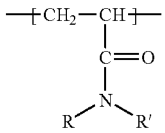

wherein (i) R is hydrogen, alkyl having from 1 to about 10 carbon atoms, or substituted alkyl having from 1 to about 10 carbon atoms, and R' is hydrogen; or (ii) R and R' together form a heterocyclic ring, which may be substituted or unsubstituted. In further embodiments, the alkyl chain of R has from about 1 to about 6 carbon atoms. The alkyl chain may be substituted with, for example, hydroxyl groups. The heterocyclic rings may be substituted with alkyl or hydroxyl. Exemplary heterocyclic rings include caprolactam and piperazine. The acrylamide polymer may have a degree of polymerization of from 2 to 10,000.

In specific embodiments, the acrylamide polymer includes at least one or two monomers of one of the following monomers (a)-(d):

(a)

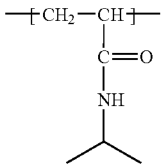

(b)

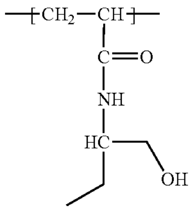

(c)

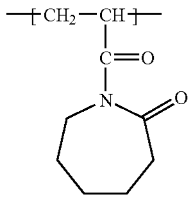

(d)

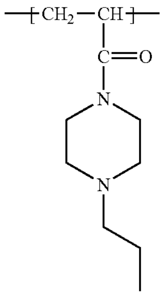

In further particular embodiments, the acrylamide polymer is a homopolymer of monomers (a)-(d).

In particular embodiments, R is isopropyl, so that the acrylamide polymer is poly(N-isopropylacrylamide) (i.e. the homopolymer) or an N-isopropylacrylamide copolymer, particularly a dipolymer having only two monomers. When the acrylamide polymer is an N-isopropylacrylamide (NIPAM) copolymer, the acrylamide monomer should comprise from 50 to 100 percent of the repeating units of the copolymer or from 50 to 100 mole percent of the copolymer. The other comonomer of the copolymer may be, for example, styrene; bisphenol-A; acrylic acid; 4-vinylphenylboronic acid (VPBA); ethylmethacrylate; methylmethacrylate (MMA); butylmethacrylate (BMA); N,N-diethylaminoethyl methacrylate (DEAEMA); or methacrylic acid (MAA). The other comonomer could also be a fluorinated alkyl acrylate or fluorinated alkyl methacrylate, such as hexafluoroisopropylmethacrylate (HFIPMA) or 2,2,3,3,4,4-hexafluorobutylmethacrylate (HFBMA). The other comonomer could also be another acrylamide monomer, such as N-ethylacrylamide (NEAM); N-methylacrylamide (NMAM); N-n-propylacrylamide (NNPAM); N-t-butylacrylamide (NtBA); N-n-butylacrylamide (NnBA) or N,N-dimethylacrylamide (DMAM).

The properties of the surface layer can be modified by adding different components to the acrylamide polymer. For example, the LCST of a homopolymer (i.e. 100 mole %) of NIPAM is about 32° C. However, the LCST of a copolymer of 70 mole % NIPAM and 30 mole % NtBA is about 20° C. Similarly, the LCST of a copolymer of 70 mole % NIPAM and 30 mole % NEAM is about 43° C. The LCST of a copolymer of 70 mole % NIPAM and 30 mole % NMAM is about 40° C. In some embodiments, the LCST of the acrylamide polymer used in the heat sensitive material is from about 25° C. to about 45° C.

Poly(N-isopropylacrylamide) (PNIPAM) is an exemplary heat sensitive material that exhibits a large change in surface energy in response to a small change in temperature. PNIPAM has a lower critical solution temperature (LCST) of about 32° C. to about 33° C. The contact angle of a water drop on a surface modified by PNIPAM changes dramatically above and below the LCST. In one experiment, an imaging member was modified with PNIPAM, and a water drop was applied. The contact angle was 63.5° at 25° C., but 93.2° at 40° C.

Poly(N-n-propylacrylamide) (PNNPAM) is another exemplary heat sensitive material that exhibits a large change in surface energy in response to a small change in temperature. PNNPAM has a lower critical solution temperature (LCST) of about 24° C.

Figure 4:
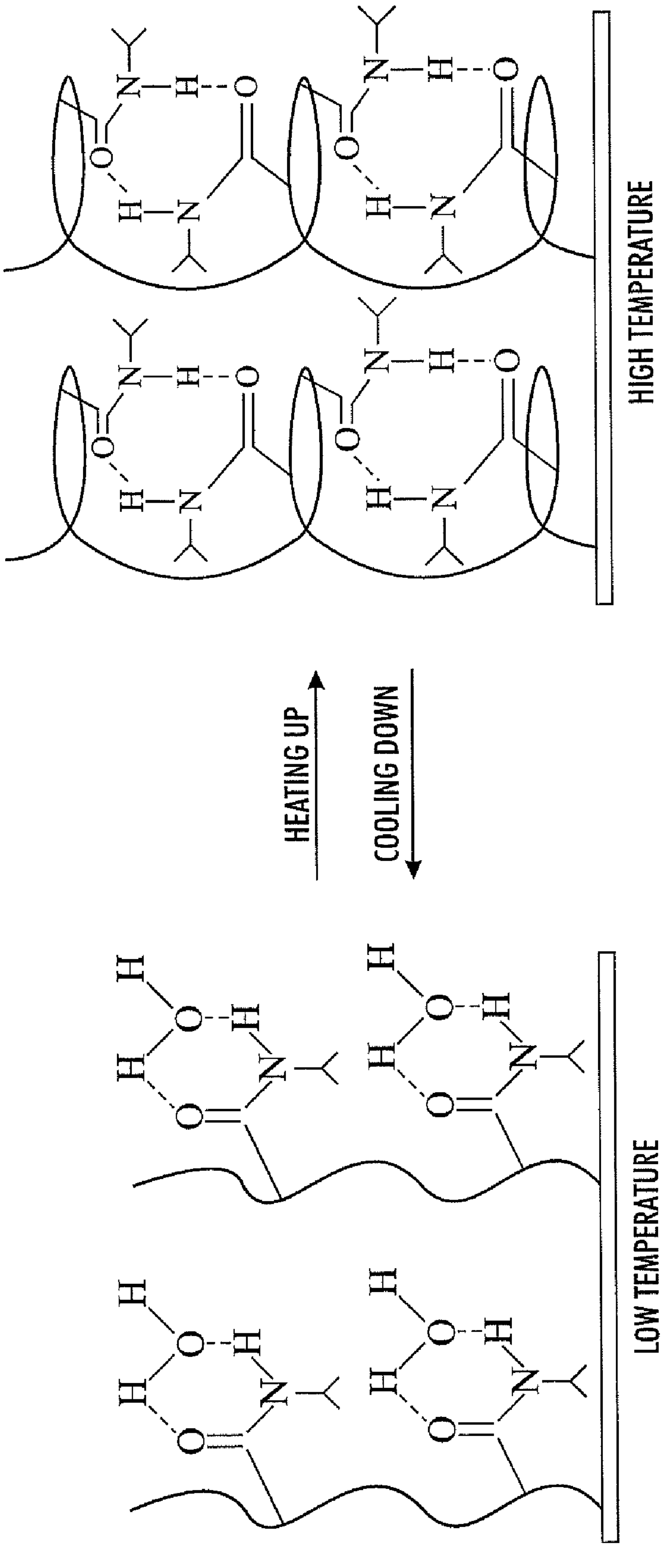
FIG. 4 is a diagram illustrating the difference in hydrogen bonding of an poly(N-isopropylacrylamide) polymer above and below a lower critical solution temperature (LCST).

Without being bound by theory, it is believed that at a temperature below LCST, the PNIPAM chains form expanded structures caused by intermolecular hydrogen bonding occurring predominantly between the PNIPAM chains and water molecules present in the applied solution. This intermolecular bonding contributes to the hydrophilicity of the PNIPAM-modified surface. However, at temperatures above the LCST, hydrogen bonding occurs predominantly between PNIPAM chains themselves, with the carbonyl oxygen atom of one PNIPAM chain bonding to the hydrogen atom on the nitrogen atom of an adjacent PNIPAM chain. This intramolecular hydrogen bonding between the C═O and N—H groups of adjacent PNIPAM chains results in a compact conformation that results in hydrophobicity at temperatures above the LCST. This interaction is shown in FIG. 4. This interaction is not dependent on the isopropyl chain, and thus should apply to other acrylamide polymers as well.

However, without being bound by theory, the acrylamide polymer (such as PNIPAM) itself has a relatively low mechanical strength. As a result, the acrylamide polymer is combined with a silicon material. The silicon material provides integrity, particularly when the surface layer is applied as a coating to the substrate. The acrylamide polymer imparts heat sensitivity, or thermal responsiveness, to the heat sensitive material.

The silicon material can take at least two different forms. In one form, the silicon material may be a silsesquioxane as shown in Formula (ii):

Formula (II)

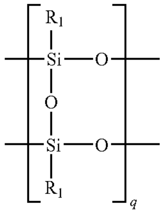

wherein $R_1$ is selected from hydrogen, alkyl, and aryl; and q is the degree of polymerization and can be from 2 to 10,000. In particular embodiments, the silicon material or silsesquioxane is poly(methyl silsesquioxane), i.e. where $R_1$ is methyl. $R_1$ is, in particular embodiments, hydrogen or alkyl having from 1 to about 6 carbon atoms. In another form, the silicon material may be silica.

In some embodiments, the heat sensitive material is a block copolymer. The acrylamide polymer makes up one block, and the silicon material makes up another block. In particular, the silicon material is a silsesquioxane as described by Formula (II). An exemplary heat sensitive block copolymer has been synthesized as shown in Scheme 1:

Scheme 1

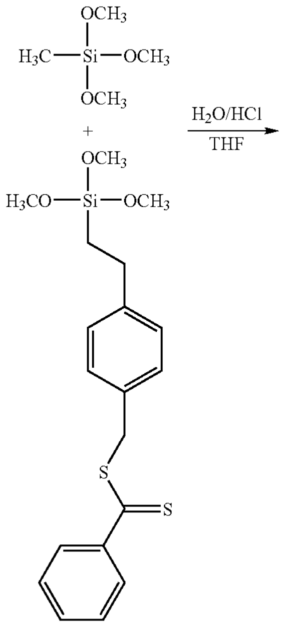

-continued

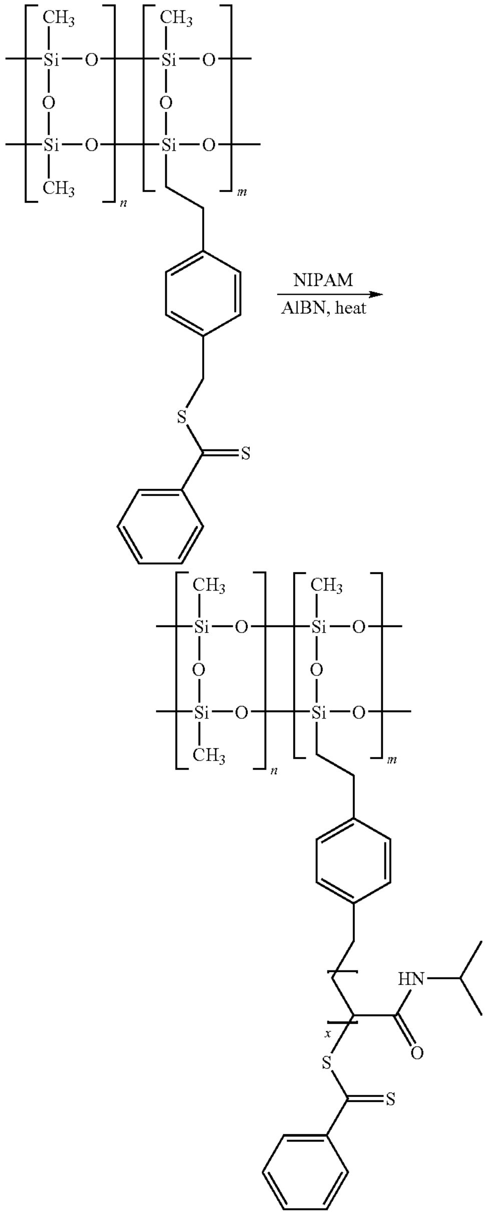

Kessler, *Macromol. Symp.* 2007, 249-260, 424-432. It is believed that analogous block copolymers may be synthesized using such methods.

In particular embodiments, the heat sensitive block copolymer may generally be of Formula (III):

Formula (III)

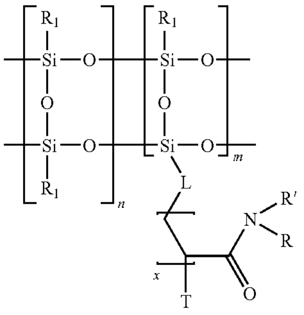

where (i) R is hydrogen, alkyl having from 1 to about 10 carbon atoms, or substituted alkyl having from 1 to about 10 carbon atoms, and R' is hydrogen; or (ii) R and R' together form a heterocyclic ring, which may be substituted or unsubstituted; $R_1$ is selected from hydrogen, alkyl, and aryl; n is the number of non-crosslinked silsesquioxane units, m is the number of crosslinked silsesquioxane units, x is the number of polyacrylamide units, L is a divalent linkage, and T is a terminating unit. The variables n, m, and x may generally be from 1 to 10,000, though they are generally greater than 2. The ratio of silsesquioxane units (n+m) to acrylamide units (x) is generally from about 25 to about 75 mole percent of the copolymer or from about 25 to about 75 percent of the repeating units of the copolymer. Exemplary divalent linkages L include alkyl and aryl. Exemplary terminating units T include alkyl and aryl. In particular embodiments, L is 1-ethylene-4-methylenephenyl ($—CH_2—CH_2—C_6H_4—CH_2—$) and T is phenylenedithioester ($—S—CS—C_6H_5$). Exemplary heterocyclic rings include epsilon-caprolactam (see monomer(c)) and n-propylpiperazine (see monomer (d)).

In other embodiments, the heat sensitive material is a core-shell type particle. The core is made from the silicon material and is typically silica (i.e. $SiO_2$). In other embodiments, the core is made from a metal oxide or metal nitride. The acrylamide polymer forms the shell and should be considered as polymeric chains extending from the core. The particles can then be coated on the substrate to form the surface layer by solution deposition, such as an aqueous/alcohol colloid solution.

When the core is made from a metal oxide or metal nitride, exemplary metals include silicon, iron, calcium, magnesium, lithium, manganese, and titanium.

Figure 9:
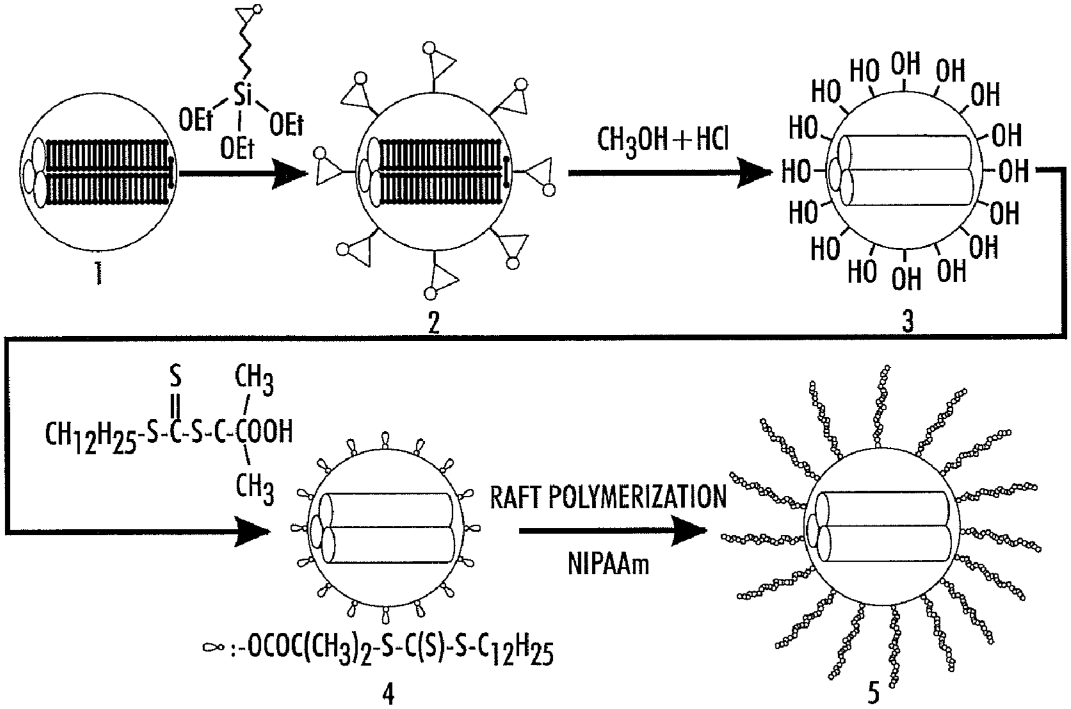
FIG. 9 is a diagram illustrating one method of attaching an acrylamide polymer chain to a silica core suitable for use in the present disclosure.

The acrylamide polymer can be chemically attached to the silica surface by various routes. For example, Hong, *J. Phys. Chem. C,* 2008, 112, 15320-15324 reported the synthesis of a PNIPAM modified silica core-shell particle via surface reversible addition-fragmentation chain transfer (RAFT) polymerization as shown in FIG. 9.

Figure 10:
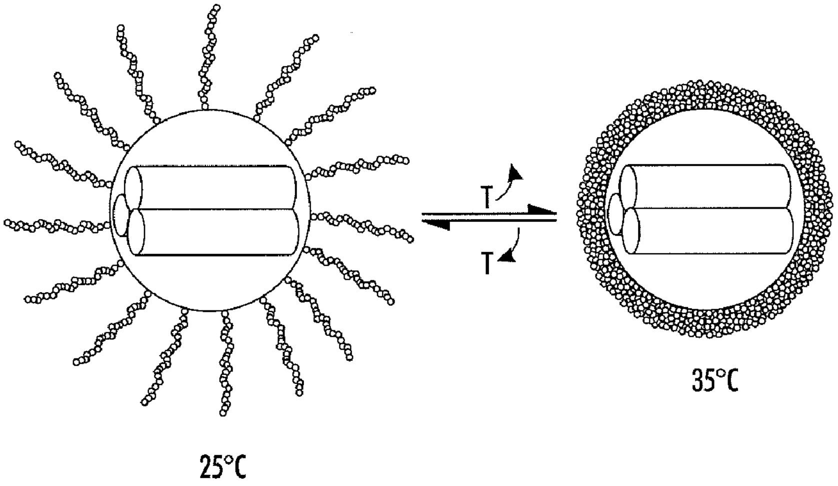
FIG. 10 is a diagram illustrating the change in conformation of a core-shell particle in the present disclosure.

A change in the conformation of the PNIPAM nanoshell can be induced by a temperature change. This is illustrated in FIG. 10. When the acrylamide polymer is hydrophilic, the acrylamide chains are long and the particle has a large diameter (see the left side of the figure). When the temperature changes so that the acrylamide polymer is hydrophobic, the acrylamide chains collapse on the surface of the silica core, forming a compact closed nanoshell around the silica core (see the right side of the figure).

It should be noted that the acrylamide polymer in the core-shell configuration may be a copolymer or an acrylamide homopolymer.

The heat sensitive material can be considered heat sensitive in at least three different ways. The heat sensitive material can be considered as switching states (e.g. between hydrophilic and hydrophobic) when exposed to a temperature change of from about 10° C. to about 80° C. (i.e., a relative temperature difference), particularly a temperature change of from about 10° C. to about 20° C. Alternatively, the heat sensitive material can switch states when exposed to a temperature of greater than about 20° C. and less than about 120° C. (i.e. an absolute temperature). In some embodiments, the heat sensitive material switches states when exposed to a temperature of greater than about 25° C. and less than about 90° C. or from about 30° C. and less than about 55° C. Finally, the heat sensitive material may switch states at a temperature of from about 25° C., to about 40° C., including about 32° C.

The direction in which the heat sensitive material switches when heat is applied may vary. In some embodiments, the material is ink compatible at a relatively lower temperature and ink non-compatible at a relatively higher temperature. In some other embodiments, it is ink compatible at a relatively higher temperature and ink non-compatible at a relatively lower temperature. In some embodiments, the material is hydrophilic at room temperature (i.e. from about 23° C. to about 25° C.) and hydrophobic at an elevated temperature. In other embodiments, the material is oleophilic at room temperature and oleophobic at an elevated temperature.

The heat sensitive material is generally deposited upon a surface of the substrate or another layer upon the substrate to form the surface layer of the imaging member. In some embodiments, the surface layer is a self-assembled monolayer of the acrylamide polymer. In other embodiments, the surface layer consists of the heat sensitive material. For example, the surface layer can be made from the acrylamide-silsesquioxane block copolymer or from the core-shell particles. If desired, a composite surface layer could be formed by dispersing other materials, such as strong radiation-absorbing particles like carbon black or carbon nanotubes, within a network formed by the heat sensitive material. As another example, the hydrophobicity of the surface layer could be modified by including hydrophobic octadecylsilane with either the acrylamide-silsesquioxane block copolymer or the core-shell particles. With the block copolymer, as seen in FIG. 4, the surface layer can be considered as a layer of polymeric chains extending from the surface of the substrate. Methods of forming a surface layer are known in the art.

The response time of the surface layer (i.e, the time it takes for the heat sensitive material to switch states) affects the maximum print speed of the printing apparatus. There are two factors that contribute to the total response time: (1) the thermal response time; and (2) the conformation response time. The thermal response time indicates how quickly the imaging member can switch between two operating temperatures, and depends on the power used to heat a given area on the surface layer. For a given heating power, the thermal response time of a NIPAM-modified surface is very short due to the small temperature difference that needs to be provided to switch between the hydrophilic and hydrophobic states. The conformation response time indicates how quickly the acrylamide polymer chains can change their conformation in response to the temperature change. In experiments, PNIPAM polymers became insoluble in water within 300 milliseconds. Thus, the conformation response time of a surface layer of PNIPAM chains on a two-dimensional surface should be in the order of milliseconds as well. In embodiments, the surface layer can switch between the two states within one second (i.e. 1000 milliseconds). In other embodiments, the surface layer can switch states within 500 milliseconds.

If desired, the mechanical strength of the surface layer comprising a heat-sensitive material can be improved. For example, composite materials, such as nanofillers, can be included. As another example, the surface layer could include other polymers that crosslink with the block copolymer or the core-shell particles. It is also contemplated that the surface layer comprising a heat-sensitive material could be constructed separately from the substrate of the imaging member. The surface layer could be made in the form of a sleeve which could be easily removed and replaced.

Figure 7:
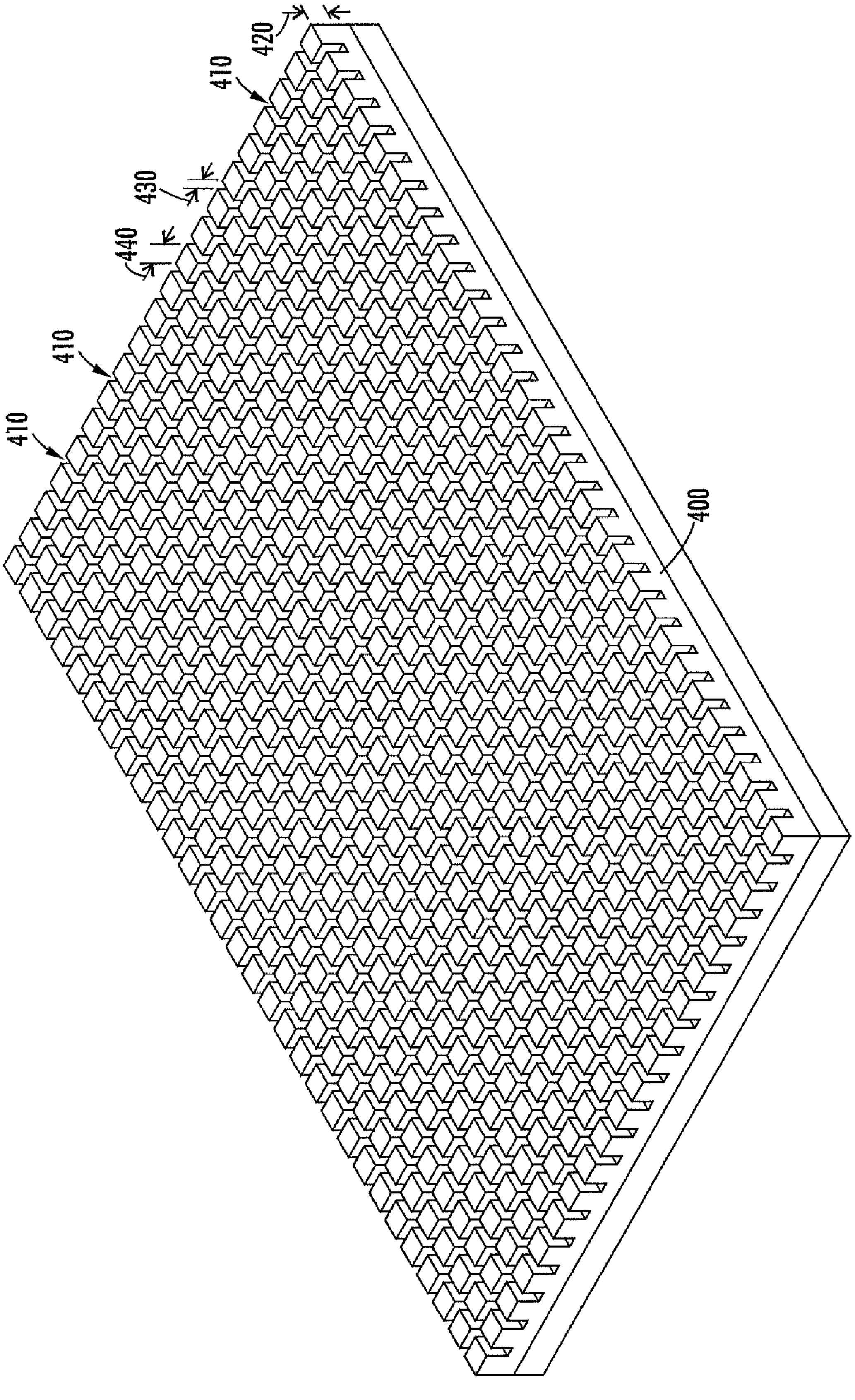
FIG. 7 is an exemplary embodiment of an imaging member of the present disclosure, wherein the surface layer is roughened by the presence of grooves.

The roughness of the surface layer may be manipulated to amplify the ink compatibility/non-compatibility (hydrophilicity/hydrophobicity) of the heat sensitive material. In other words, the surface layer can be non-smooth. Put in other ways, the upper surface of the surface layer does not maintain a constant distance from the substrate upon which it rests, or the surface layer can vary in thickness from its lowest point to its highest point. This surface roughness can be accomplished by several means. For example, material can be added or removed from the top of the surface layer to form structures that prevent the surface layer from being smooth. As another example, if the surface layer is coated onto the substrate, the surface layer may be slightly roughened during the application and/or prevented from being smoothed out. Generally speaking, the surface roughness may be created by the addition, subtraction, or creation of orderly structures and/or randomly arranged structures on the micron or nanometer scale, or by multiscale (hierarchical) structures. In some embodiments, as shown in FIG. 7, the surface layer 400 may comprise grooves 410 (although shown here as flat, the surface layer does not have to be flat). The grooves may have a depth 420 of from about 10 nanometers to about 10 microns. The grooves may have a width 430 of from about 10 nanometers to about 10 microns. There may be a spacing 440 of from about 10 nanometers to about 100 microns between adjacent grooves. The size and spacing of the grooves is generally regular, though it may vary in some embodiments. The grooves could be made in both the lateral and longitudinal direction, to form a checkerboard pattern, for example. However, any regular uniform pattern made from any shape is contemplated. For example, the surface roughness could be made from shapes such as bumps and pillars. Such patterns can be made, for example, by laser engraving or other means. In some other embodiment, the roughness is created as a part of a coating process. In embodiments, the surface layer may have a roughness of from about 10 nanometers to about 100 microns in the lateral direction (i.e. along the surface) and from about 10 nanometers to about 10 microns in the vertical direction (i.e. perpendicular to the surface).

Any suitable temperature source may be used as the primary heat source to cause the temperature change in the surface layer. Exemplary heat sources include an optical heating device such as a laser or an LED bar, a thermal print head, resistive heating fingers, or a microheater array. A resistive heating finger is an array of finger-like micro-electrodes that result in resistive heating when the fingers are in contact with the surface that is to be heated. In all cases, the heat source may be used to selectively heat the surface layer for pixel addressability.

Figure 5:
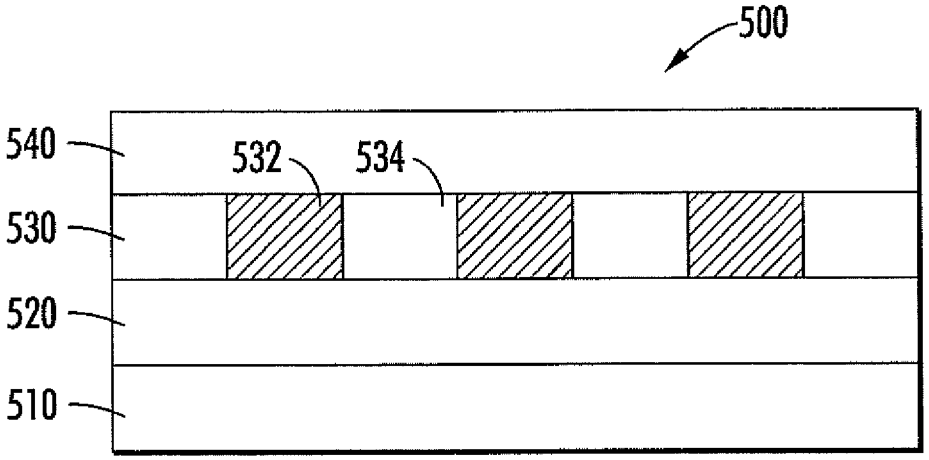
FIG. 5 is an exemplary embodiment of an imaging member of the present disclosure.

The primary heat source and the optional secondary heat source may be located anywhere within the printing apparatus where their function can be accomplished. For example, as shown in FIG. 1, the primary heat source 140 is located within cylindrical imaging member 110. In FIG. 2, the primary heat source 240 is depicted as a thermal print head, i.e. a module separate from the imaging member. In some embodiments such as that depicted in FIG. 5, the heat source is located within the imaging member between the substrate and the surface layer. As shown here, the imaging member 500 comprises a substrate 510, surface layer 540, and heat source 530 between them. This embodiment may be appropriate, for example, when the heat source is a two-dimensional microheater array. These microheaters could be resistor-based heaters or transistor-based heaters that can be individually turned on and off to selectively heat the surface layer. Microheaters 532 are separated by a suitable filling material 534. A thermal insulation layer 520 may also be located between the substrate and the heat-sensitive surface layer to prevent heat loss through the substrate. Optionally, the thermal insulation layer 520 could also be made of a conformable material. If the thermal insulation layer and the substrate are transparent to radiation, then a heat source, such as a laser, could still be placed on the substrate side of the imaging member (e.g. inside the cylinder).

Figure 6:
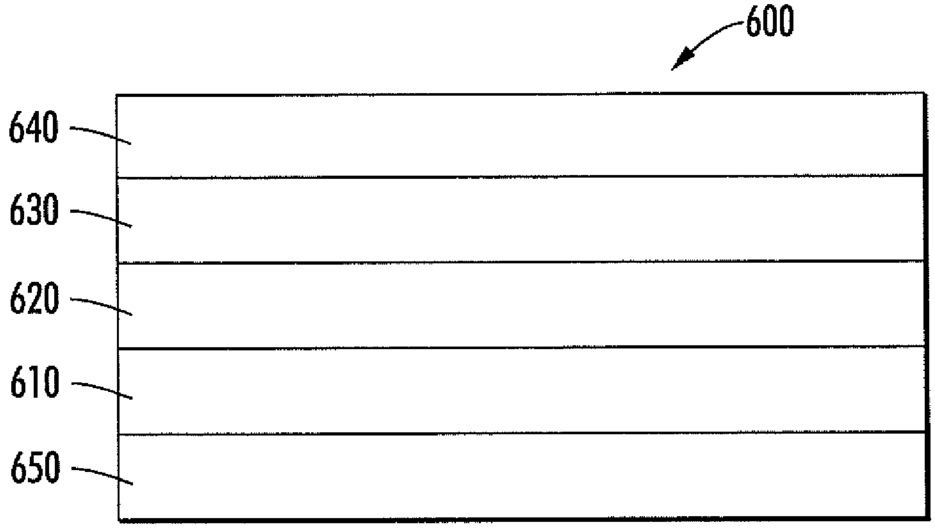
FIG. 6 is another exemplary embodiment of an imaging member of the present disclosure.

In other embodiments depicted in FIG. 6, the imaging member 600 comprises substrate 610, thermal insulation layer 620, an absorption layer 630, and surface layer 640. The heat source, for example an image-wise addressable laser, would transmit radiation to be absorbed by the absorption layer 630, which would then heat the surface layer 640 and cause the surface layer to switch states in selective areas. Generally, the absorption layer is able to absorb energy from the heat source. For example, if the heat source is a radiation source such as a laser, the absorption layer would be a radiation absorption layer. If the heat source is an acoustic energy source, the absorption layer would be an acoustic energy absorption layer. An exemplary absorption layer is a polymeric material which contains carbon black embedded or dispersed therein. The heat source would be addressable and heat specific cells of the absorption layer 630, which would then change the wettability state of the surface layer 640.

In yet another system, the absorption layer 630 is made with a pixel-wise addressable material. For example, the absorption layer could be made from a metamaterial. A metamaterial is a macroscopic composite material having a manmade, three-dimensional, periodic cellular architecture designed to produce a combination, not available in nature, of two or more responses to a specific excitation. For example, the absorption layer could comprise a metamaterial that is divided into absorption-tunable cells to act as an addressable layer. An electrical signal to a cell of the metamaterial would control the absorption coefficient of that cell, particularly for an active metamaterial which has a tunable element such as a capacitor. Broad uniform light illumination could then be used with such an absorption layer, rather than requiring the heat source to be addressable.

In another system, if an acoustic heat source was used instead of a radiation heat source, the absorption layer 630 could be an acoustic energy absorber relative to the other layers. To obtain the spatial resolution, the acoustic source could be an array of electrically addressable acoustic sources.

The fountain solution source and ink source may also be temperature controlled to optimize temperature contrast in the nip region where they are applied to the imaging member.

The imaging members of the present disclosure allow for digital lithography "on the fly". Because the surface layer can switch states after application of a small temperature change (as low as about 15° C.), energy requirements are modest compared to metallic oxide-based surfaces that do not switch states until the imaging members reach a temperature of above 200° C.

Figure 8:
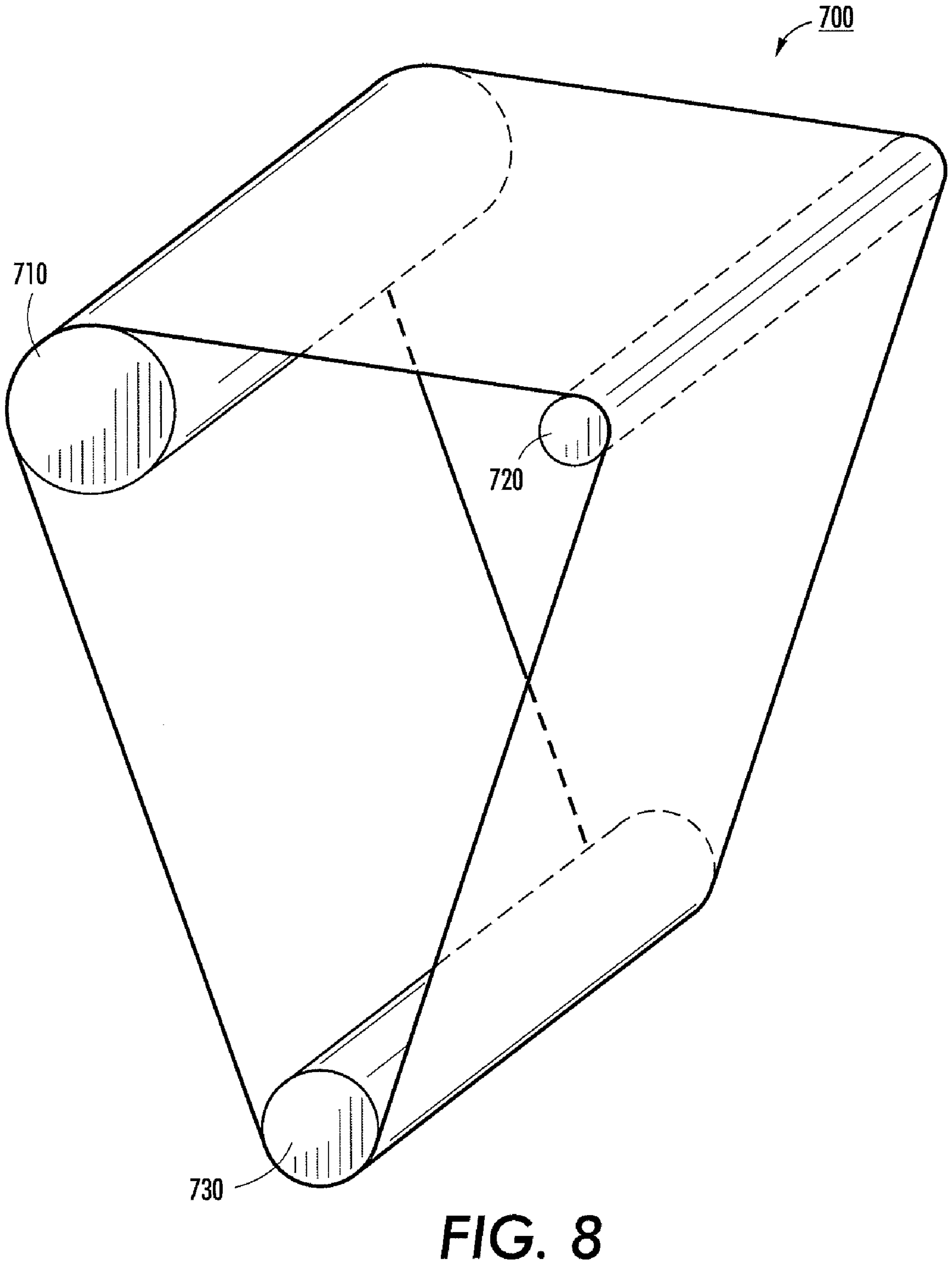
FIG. 8 shows an exemplary embodiment of an imaging member of the present disclosure, wherein the imaging member is in the form of a flexible belt.

The substrate of the imaging member may be opaque or substantially transparent and may comprise any suitable material having the required mechanical properties. For example, the substrate may comprise a layer of an electrically non-conductive, semiconductive, or conductive material such as an inorganic or an organic composition. Various resins may be employed as non-conductive materials including polyimides, polyesters, polycarbonates, polyamides, polyurethanes, and the like, which are flexible as thin webs. An electrically conducting substrate may be any metal, for example, aluminum, nickel, steel, copper, and the like or a polymeric material, as described above, filled with an electrically conducting substance, such as carbon, metallic powder, and the like or an organic electrically conducting material. The electrically insulating, semiconductive, or conductive substrate may be in the form of an endless flexible belt, a web, a cylindrical sleeve that is placed on a cylinder, a cylinder, a sheet, and the like. In particular embodiments, the imaging member (and the substrate) are in the form of a flexible belt, a cylindrical sleeve, or a cylinder. FIG. 8 depicts an imaging member 700 in the form of a belt which is placed around rollers 710, 720, and 730. The substrate of the imaging member contacts the rollers, while the surface layer faces outwards.

The thickness of the substrate depends on numerous factors, including strength and desired and economical considerations. A flexible belt may be of substantial thickness, for example, about 250 microns, or of minimum thickness, e.g., less than 50 microns, provided there are no adverse effects on the final device.

In embodiments where the substrate is not conductive, the surface thereof may be rendered electrically conductive by an electrically conductive coating. The conductive coating may vary in thickness over substantially wide ranges depending upon the optical transparency, degree of flexibility desired, and economic factors. Accordingly, for a flexible imaging member, the thickness of the conductive coating may be from about 1 nanometer to about 10 microns, and more preferably from about 10 nanometers to about 500 nanometers, for an optimum combination of electrical conductivity, flexibility, and light transmission. The flexible conductive coating may be an electrically conductive layer formed, for example, on the substrate by any suitable coating technique, such as a vacuum depositing technique or electrodeposition. The coating could use any typical coating metal or non-metal material, including ITO, tin, gold, aluminum, zirconium, niobium, tantalum, vanadium and hafnium, titanium, chromium, tungsten, molybdenum, and the like.

The radiation absorption layer 630 may be made from, for example, a high temperature resin having radiation-absorbing particles dispersed therein. This type of layer may have high light absorption efficiency and good thermal conductivity. Radiation-absorbing particles may include carbon black particles and carbon nanotubes. The radiation-absorbing particles may be from about 1.0 weight percent to about 50 weight percent of the radiation absorption layer. Exemplary high temperature resins include polyimide, mono/bis-maleimides, poly(amide-imide), polyetherimide, and polyetheretherketone. Additional materials, such as silver powder, may be added to the layer to improve material properties. The radiation absorption layer may also include dyes or pigments that have strong absorption at wavelengths (UV to IR) matching the wavelength of the radiation source. The thickness of the radiation absorption layer may be from about 20 nanometers to about 5,000 nanometers.

The thermal insulation layer may be made from low thermal conductivity materials, such as polyimide, polyurethane, and polystyrene. The thickness of the thermal insulation layer may be from about 50 microns to about 1 centimeter.

In other embodiments, a conformable layer 650 may be present to enable good contact to be made between the imaging member and other parts of a printing apparatus, for example when the imaging member is in the form of a cylindrical surface for mounting onto a cylinder. A typical conformable layer could be made from materials such as silicone, VITON®, a combination of both, etc., with fillers such as carbon and other nanofillers.

Aspects of the present disclosure may be further understood by referring to the following examples. The examples are merely for further describing various aspects of the imaging members and printing apparatuses of the present disclosure and are not intended to be limiting embodiments thereof.

EXAMPLES

Example 1

A block copolymer of poly(methyl silsesquioxane) (PMSSQ) and NIPAM is made. The block copolymer is about 20 weight % PMSSQ and 80 weight % NIPAM. The block copolymer is dissolved in THF and spin coated on the surface of a glass tube with subsequent curing at 50° C. for 20 minutes.

To check the temperature responsive behavior of the surface, capillary rise experiments with water of different temperatures are carried out. The coated glass tube is placed over a water surface just touching it. The meniscus height is measured as an indication of the surface hydrophobicity. In water at a temperature of 15° C. (below LCST of PNIPAM), the meniscus height is measured to be 3.8 centimeters, indicating a hydrophilic surface. The error of the measurement is ±0.2 centimeter. When the water is heated at 40° C. (above the LCST of PNIPAM) the meniscus height is found to be 1.4 centimeters. As a comparison, the meniscus height of an uncoated capillary tube does not change while changing the water temperature to 40° C.

Example 2

A particle having a silica core and a PNIPAM shell is prepared. In experiments, the hydrodynamic diameter of the PNIPAM/silica core-shell particle decreases as the solution temperature increases. At 25° C., PNIPAM is hydrophilic and soluble in water; the hydrodynamic diameter of the nanosphere is about 440 nanometers, and the PNIPAM chains are in a coiled state, forming a solvated, non-compact nanoshell on the exterior surface of the silica core. The hydrodynamic diameter of the core-shell nanostructure decreases from 440 nanometers to 295 nanometers gradually with a temperature increase from 25° C. to 36° C., which results from the fact that the solubility of PNIPAM chains in water decreased with increasing solution temperature.

The imaging members, printing apparatuses, and methods of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. An imaging member comprising:

a substrate; and a surface layer comprising a heat sensitive material, wherein the heat sensitive material is a block copolymer comprising acrylamide blocks and polysilsequioxane blocks.

2. A printing apparatus comprising:

a heat source;

an ink source; and an imaging member comprising (i) a substrate and (ii) a surface layer comprising a heat sensitive material, wherein the heat sensitive material is a block copolymer comprising acrylamide blocks and polysilsequioxane blocks.

3. The printing apparatus of claim 2, wherein the acrylamide blocks comprise an N-isopropylacrylamide monomer.

4. The printing apparatus of claim 2, wherein the acrylamide blocks consist of N-isopropylacrylamide.

5. The printing apparatus of claim 2, wherein the heat sensitive material switches states when exposed to a temperature of from about 10° C. to about 120° C.

6. The printing apparatus of claim 2, wherein the heat sensitive material switches states when exposed to a temperature greater than about 25° C. and less than about 90° C.

7. The printing apparatus of claim 2, wherein the heat sensitive material switches states at a temperature of about 25° C. to about 40° C.

8. The printing apparatus of claim 2, wherein the acrylamide blocks and polysilsequioxane blocks are separated by a divalent linkage.

9. The printing apparatus of claim 2, further comprising an absorption layer between the substrate and the surface layer, the absorption layer being capable of absorbing radiation energy or acoustic energy.

10. The printing apparatus of claim 9, wherein the absorption layer is a radiation absorption layer and comprises a metamaterial.

11. The printing apparatus of claim 2, wherein the surface layer is rough.

12. The printing apparatus of claim 2, wherein the heat source is an electromagnetic heating device, acoustic heating device, thermal print head, resistive heating finger, or microheater array.

13. The printing apparatus of claim 2, wherein the heat source is located within the printing apparatus between the substrate and the surface layer.

14. The printing apparatus of claim 2, further comprising an intermediate transfer member that forms a transfer nip with the printing apparatus.

15. The printing apparatus of claim 14, further comprising a secondary heat source adapted to provide heat near the transfer nip.

16. The printing apparatus of claim 2, wherein the acrylamide blocks comprise a monomer selected from the group consisting of monomers (a)-(d):

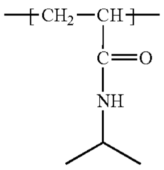

(a)

-continued

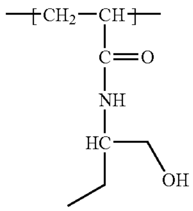

(b)

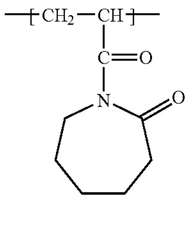

(c)

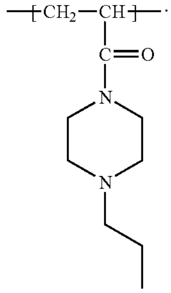

(d)

17. An imaging member, comprising:

a substrate; and a surface layer comprising a heat sensitive material, wherein the heat sensitive material is a block copolymer comprising acrylamide blocks and blocks of poly(methyl silsequioxane).

* * * * *